Patented Oct. 10, 1939

2,175,359

UNITED STATES PATENT OFFICE 2,175,359

PROCESS FOR PRODUCING AND RECOVERING BRANCHED CHAIN ALIPHATICS

Ernest A. Ocon, Yonkers, N. Y.

No Drawing. Application January 8, 1938,
Serial No. 184,107

3 Claims. (Cl. 260—676)

This invention relates to the manufacture of branched chain aliphatic hydrocarbons by a novel method from straight chain aliphatics which occur largely in natural gas and crude petroleums and from oxygenated derivatives of such hydrocarbons; also, to an efficient transformation of such straight chain aliphatics and their oxygenated derivatives into aviation gasoline ingredients and high quality lubricating oil ingredients.

With augmented production of oxygen compounds of paraffins in the solvent extraction of olefins by oxidizing acids, e. g., sulphuric acid, the increased synthesis of alcohols by fermentation and from gases, and reforming of straight run gasoline by oxidation, and other oxidizing reactions, a need has arisen for recovering more valuable products useful in internal combustion engines from such oxygenated derivatives.

A principal object of this invention is to provide a highly efficient reduction reaction with a highly active catalyst for aiding in what appears to be an isomerization or rearrangement of the organic compounds treated with a removal of oxy groups, termed briefly as a hydrocarbonization or hydroisomerization, and which will be explained more fully hereinafter. A related object inheres in providing the oxy-derivatives for the hydroisomerization by oxidation of straight chain hydrocarbons, and in treating the iso-aliphatic products to prepare desirable motor fuel and lubricating oil ingredients so that by a highly efficient combination of steps, valuable commercial products are produced from less valuable straight chain paraffins. Principal features involved in attaining this object are in the hydrogenation of low boiling iso-aliphatics to produce low gum-forming high anti-knock aviation motor fuel ingredients and in the recovery of high quality lubricating oil constituents from lubricating oil extracts by a novel method devised wherein high boiling iso-aliphatics aid in the separation of the extract ingredients and combine with them.

In accordance with the novel method of transforming normal alcohols and other straight chain oxy-hydrocarbons into iso-aliphatic hydrocarbons, such starting materials being obtained, for example, in the treatment of gases from a cracking process at temperatures of about 90° F. or higher, with concentrated sulphuric acid to remove mainly iso-olefins followed by a dilution of the acid mixture with water and a distillation, whereby alcohols are produced by hydrolysis and distilled over, the thus obtained oxy-hydrocarbons are passed with suitable proportions of reducing gas, e. g., water gas or water gas enriched with hydrogen, into contact with a catalyst which has predominating efficacy for hydrogenating but with slight water absorption or dehydration ability, e. g., zinc oxide, chromium sesquioxide, cuprous oxide, manganous oxide, and the like, singly or mixed, and in the presence of an alkaline compound, e. g., potassium carbonate, potassium hydroxide, alkali salts of aliphatic acids, or the like. The temperature may suitably be in the range of 600 to 900° F., the pressure about 1 atmosphere or higher, and the time of contact a period of several minutes or more.

In starting with a mixture of organic compounds comprising aliphatic acids, it is desirable to add an alkali hydroxide to the mixture to saponify some of the acids at least, instead of mixing the alkali with the hydrogenating catalyst.

The catalyst may be advantageously used in a carrier which is relatively inert, e, g., pumice, unglazed porcelain, and the like. Other catalyst mixtures considered of value are mixtures of metals or metal compounds with predominating hydrogenating activity mixed with relatively smaller proportions of compounds with dehydrating activity, e. g., cobalt with a relatively smaller proportion of alumina, molybdic acid anhydride with a relatively smaller proportion of alumina, etc., in general, metals or compounds of metals in the 6th to 8th groups of the periodic system mixed with relatively smaller proportions of oxides of metals in the 3rd to the 5th groups of the periodic system, and with a small proportion of alkali promoter. Oxides of metals in the first and second groups, i. e., right hand members, such as cuprous oxide, zinc oxide, etc. can be considered to function as do the oxides of metals in the 6th to 8th group of the periodic system. It is best to avoid, however, the use of a catalyst with too strong hydrogenating tendencies, such as nickel.

Preferably the reducing gas should contain an excess of hydrogen. In using water gas, this gas should be enriched to contain about 2 moles of hydrogen or more to one of carbon monoxide. The space velocity of the reactants over the catalyst should be preferably between about 75 to 200 cubic feet per hour per cubic foot of catalyst. Paraffinic hydrocarbons may also be admixed with the reactants to supply hydrogen.

Vapor products from the catalytic hydroisomerization zone are preferably fractionated in a fractionation zone to obtain as overhead a mixture comprising low boiling hydrocarbons, and an intermediate reflux fraction containing unconverted alcohols, which may be recycled to the catalytic zone. A heavy unvaporized hydrocarbon fraction may be removed from the catalytic zone.

Low boiling hydrocarbons in the overhead of the fractionated vapors from the hydro-isomerization are a valuable source of anti-knock motor fuel ingredients and can be hydrogenated to obtain complete saturation especially to form aviation motor fuel or first mildly polymerized to increase their molecular weight if necessary, while the intermediate reflux condensate may be subjected to extraction with an alcohol solvent, e. g., water to separate the unconverted oxy-hydrocarbons from hydrocarbons with subsequent separation of the oxy-hydrocarbons, as by distillation.

Intermediate branched aliphatic products, thus recovered, having too high boiling points for use in motor fuel have been found especially useful in the related object of producing high quality lubricants.

Low boiling overhead vapors from the fractionation are subjected to condensation at temperatures controlled to obtain the desired normally liquid cut, while difficulty condensible vapors from this condensation may be subjected to polymerization with the aid of catalysts, such as sulphuric acid, phosphoric acid, and their salts known to have high dehydrating and polymerizing power, e. g., sulphates of magnesium, aluminum, calcium, aluminum phosphate, magnesium, pyrophosphate, magnesium ortho-phosphate, calcium ortho-phosphate, activated alumina, orthophosphoric acid on pumice, phosphorus pentoxide on pumice, and the like. The products of this treatment may be advantageously fractionated in the aforesaid fractionation zone, together with the vapors from the hydro-isomerization. The polymerization may be carried out in the vapor phase at about 250° F.

The low boiling iso-aliphatics which need improvement by saturation with hydrogen are suitably treated with hydrogen at about 200° F. in the presence of a catalyst of the nature of nickel or nickel oxide supported on a carrier, e. g., clay, alumina, magnesia, etc.

Among other catalysts which are advantageous for saturating the motor fuel iso-aliphatic hydrocarbons obtained by the hydro-isomerization, e. g., iso-octenes, iso-heptenes, etc. is metallic copper produced by careful dehydration of the hydroxide precipitated by alkaline compounds, the dehydration by a reduction being carried out in the presence of promoters, such as ceria, beryllium oxide, zinc oxide, chromium oxide or the like.

Use can be made of iso-aliphatics higher boiling than gasoline from the hydro-isomerization to prepare lubricating oils by interpolymerizing such iso-aliphatics with extracted lubricating oil constituents, especially, in first using such hydrocarbons to further a differential separation of lubricating ingredients from an extract obtained in selectively dissolving mainly cyclic and unsaturated hydrocarbons in a lubricating oil stock, this differential separation being carried out at low temperatures of the order of ordinary atmospheric temperatures or lower and especially aided by the use of a low polar solvent which acts as a solvent for the iso-aliphatics and mutually as a solvent for valuable recoverable ingredients in the selective solvent extract. Such low polar solvents of the type of carbon tetrachoride, ketones, such as diacetone, aliphatic ethers, aliphatic ester, and the like, which mutually dissolve iso-aliphatics and desirable constituents from the selective solvent extract are considered as suitable media for the differential separation. Such media appear to have the power of breaking down associated molecules into simpler ones. The desired ingredients dissolved in these media can be reacted with the mutually soluble iso-aliphatics in the presence of polymerizing or alkylating agents such as Friedl Crafts' reagents of the type of anhydrous aluminum chloride, boron fluoride, etc. to produce more valuable lubricating oil constituents, which are later separated by distillation.

While the invention has been described with reference to specific materials, conditions and proportions of reactants and solvents, it is to be understood that the scope of my invention is not to be limited thereto except insofar as set forth in the appended claims.

In actual practice the process may be carried out in a variety of form of apparatus. The apparatus will include pumps, pumps to supply the pressures required, temperature and pressure controllers, etc., to obtain the process and operating conditions hereinbefore specified and which will be employed as is well known in the art.

Having described my invention, what I claim and desire to secure by Letters Patent, is as follows:

1. A method for producing iso-aliphatic hydrocarbons suitable as high anti-knock motor fuel, which comprises reacting oxygenated derivatives of straight chain aliphatic hydrocarbons including alcohols and fatty acid in about the gasoline boiling range with an alkali compound capable of saponifying fatty acids among such derivatives, reacting the thus treated mixture with a reducing gas composed of hydrogen and carbon monoxide in the presence of a catalyst with relatively high hydrogenating and low dehydrating activity at a temperature of about 600 to 900° F., at super-atmospheric pressure and with a space velocity of about 75 to 200 cubic feet per hour per cubic foot of catalyst., fractionating vapors from this catalytic reaction to obtain an overhead of motor fuel ingredients, and condensing such motor fuel ingredients.

2. A process in accordance with the method of claim 1, in which the catalyst of high hydrogenating and relatively low dehydrating activity is selected from a substance containing a metal in the group consisting of copper, zinc, chromium, manganese, cobalt.

3. The method for producing iso-aliphatic hydrocarbons suitable as high anti-knock motor fuel which comprises reacting straight chain aliphatic oxygenated derivatives of paraffin hydrocarbons, said oxygenated derivatives including normal alcohols and fatty acids boiling in about the gasoline boiling range, with an alkali metal compound capable of saponifying fatty acids among such derivatives, reacting thus treated oxygenated derivatives with a reducing gas containing hydrogen in the presence of catalysts which promote hydrogenation and dehydration at a temperature in the range of about 600 to 900° F., for a sufficient period of time to convert the straight chain oxygen containing aliphatic compounds into iso-aliphatic products, removing said iso-aliphatic products and condensing therefrom gasoline boiling range compounds as motor fuel ingredients.

ERNEST A. OCON.